UNITED STATES PATENT OFFICE.

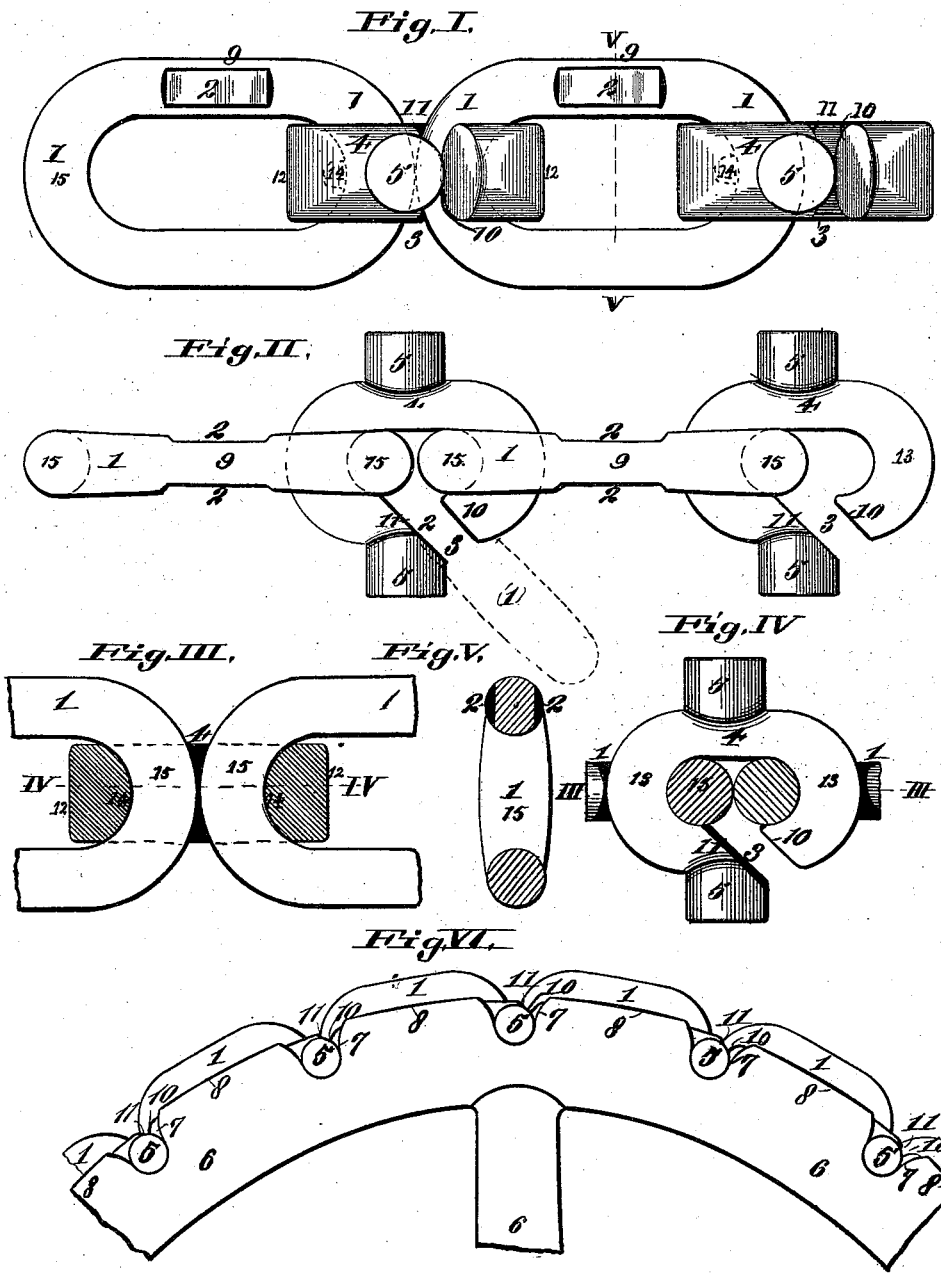

ADAM RITSCHER, OF TAYLORVILLE, ILLINOIS.

DETACHABLE-LINK DRIVE-CHAIN.

SPECIFICATION forming part of Letters Patent No. 532,705, dated January 15, 1895.

Application filed February 12, 1894. Serial No. 499,901. (No model.)

*To all whom it may concern:*

Be it known that I, ADAM RITSCHER, a citizen of the United States, and a resident of Taylorville, in the county of Christian and State of Illinois, have invented a certain new and useful Improvement in Detachable-Link Drive-Chains, of which the following is a full, clear, and exact description, reference being had to the accompanying drawings, forming part of this specification.

This invention relates to drive-chains which have their links coupled and uncoupled by manipulation; and the invention consists in features of novelty hereinafter fully described and claimed.

Figure I is a side view of the main links of a section of the drive-chain, with an edge view of the coupling links. Fig. II is a like view with the position of said links reversed. Fig. III is partly a detail section taken on line III—III, Fig. IV, and partly a side view, and shows a coupling link in section, and the main links in their working position when coupled therein. Fig. IV is partly a detail section taken on line IV—IV, Fig. III, and partly a side view and shows the main links in section, and a coupling link in its working position. Fig. V is a vertical section, taken on line V—V, Fig. I, and shows the countersinks in one of the sides of a main link, to enable its insertion within the coupling link. Fig. VI is a detail side view of a drive wheel, the lugs on the coupling links seated in the countersinks of the drive wheel.

Referring to the drawings:—1 represents the main continuous links of my drive-chain, and 2 are the parallel countersinks in one side of said links, that for a limited distance reduces the thickness of said link, at one side to enable its insertion, (when rightly manipulated,) through the diagonal slot 3 of the coupling link 4.

5 represents lugs that project outwardly from the middle of each side of the coupling link 4, and when said drive-chain is used on the wheel 6 work in the countersunk slots 7, between the respective ends of the elongated cogs 8 of said wheel, which they may either drive or may be driven by it, as the case may be.

It will be seen that the drive-chain can be constructed of any required length without welding (other than the previous welding of the main links 1).

In the operation of setting up the chain, the contracted edge 9 between the parallel countersinks 2 of the main link 1, is manipulated so as to pass through the diagonal slot 3 of a coupling link 4, as shown in broken lines in Fig. II. The main link is then manipulated so as to turn one of its ends into its ultimate seat within said coupling link, in which position it is locked to its bearings, because the short countersunk contracted portion 9 in one side of said link is then remote from the slot in the coupling link through which it had entered. At the same time the end of said main link, freely moves in said bearings within the coupling link, in response to the general trend of the drive-chain, as for instance in its curvilinear movement over the wheel 6. A second coupling link is then inserted by the same means, its slot 3, providing a ready entrance for the short contracted edge 9 between the countersinks 2, on one side of the main link, and then said coupling link is turned to the previously unoccupied end of the main link where it and the other coupling link exercise their combined bearings; and thus adfinitum, the drive-chain can be built up to any required length, and can also by the same means be further lengthened or reduced in length, as the future exigencies of the case may require, if the chain stretches, or a link should break.

It will be seen that by the peculiar provision of the diagonal slot 3 through the side of the coupling link 4, the said coupling link has the bevel underlap hook 10, and the bevel overlap hook 11, from which overlap hook 11, one of the respective lugs 5, projects laterally and integrally and the bevel overlap of said lug 5 extends on line with the face of said overlap hook 11, and completes the overlap boundary of said diagonal coupling slot 3. It will also be seen that when said chain is set up and in operation there is no possibility of its connection being accidentally knocked down, as the traction of the coupling links is exercised on the ends of the main links, in which position they are safely locked to their connection; and said lock is still further secured and the traction strength of said coupling link is increased, as is also the bearing surface thereof on the main links it couples by the increased thickness at 12 of said coupling link 4 where at each of its coupling ends it effects its grasp hold of the main continuous links 1. By said construction also the increased bearing surface 14, so nearly fills its coupling bearing within the main links, as to constitute an anti-rattling coupling of the chain, which adds largely to its strength, and lessens its wear and draft friction. Again, it will be seen that the expanded thickness of the main links 1 at their ends constitute anti-rattling and reinforce wearing fillings 15 within the coupling links, which increases the wearing surface and adds to the strength of the chain, without greatly adding to its weight, as the central portion of said links which are void of wear are of lighter construction.

The wheel 6 carries the lugs 5, in its countersunk slots 7 between the respective ends of its elongated cogs 8, and said wheel may either transmit the power that drives the chain or it may be the recipient of drive power from the chain and transmit it to the machinery with which it connects.

I claim as my invention—

1. A detachable link for drive-chains formed with lugs 5 at the middle of the sides thereof, and with a diagonal slot 3 extending from one side of one of said lugs to the middle of the side of the link, and providing each link with an underlap bevel hook 10, an overlap bevel hook 11, and an overlap bevel extension through the lug; substantially as described.

2. A drive-chain comprising main continuous links 1 formed with expanded ends 15, and with the parallel countersinks 2 at the side thereof, and the coupling links 4 formed with lugs 5 at the middle of the sides thereof, and with diagonal slots 3 extending from one side of one of said lugs to the middle of the side of the coupling link, and providing each coupling link with an underlap bevel hook 10, an overlap bevel hook 11 and an overlap bevel extension through the lug; substantially as described.

ADAM RITSCHER.

In presence of—
BENJN. A. KNIGHT,
C. G. EDUARDS.